(12) United States Patent
Hu

(10) Patent No.: US 11,933,440 B2
(45) Date of Patent: Mar. 19, 2024

(54) SEALING COVER WITH A QUICK-PLUG INTERFACE

(71) Applicant: Han Hu, Langfang (CN)

(72) Inventor: Han Hu, Langfang (CN)

( * ) Notice: Subject to any disclaimer, the term of this patent is extended or adjusted under 35 U.S.C. 154(b) by 0 days.

(21) Appl. No.: 17/861,366

(22) Filed: Jul. 11, 2022

(65) Prior Publication Data

US 2023/0029095 A1   Jan. 26, 2023

(30) Foreign Application Priority Data

Jul. 14, 2021   (CN) .......................... 202121600352.2

(51) Int. Cl.
*F16L 37/098* (2006.01)
*F16L 19/04* (2006.01)

(52) U.S. Cl.
CPC ........... *F16L 37/098* (2013.01); *F16L 19/046* (2013.01)

(58) Field of Classification Search
CPC ........ F16L 37/098; F16L 37/091; F16L 39/00
See application file for complete search history.

(56) References Cited

U.S. PATENT DOCUMENTS

| | | | | |
|---|---|---|---|---|
| 5,160,179 A | * | 11/1992 | Takagi | F16L 37/091 285/317 |
| 6,464,266 B1 | * | 10/2002 | O'Neill | F16L 37/091 285/40 |
| 2003/0160451 A1 | * | 8/2003 | Min-Cheol | F16L 37/091 285/358 |
| 2010/0171302 A1 | * | 7/2010 | Yoder | F16L 37/098 285/81 |
| 2010/0176587 A1 | * | 7/2010 | Oh | F16L 37/091 285/148.21 |
| 2010/0187811 A1 | * | 7/2010 | Topping | F16L 37/091 285/148.4 |
| 2010/0194102 A1 | * | 8/2010 | Keeling | F16L 37/091 285/305 |
| 2013/0106104 A1 | * | 5/2013 | Le Quere | F16L 37/091 29/505 |
| 2014/0033507 A1 | * | 2/2014 | Kluss | F16L 37/091 285/369 |
| 2015/0145249 A1 | * | 5/2015 | Taneya | F16L 37/091 285/340 |

FOREIGN PATENT DOCUMENTS

| | | | | |
|---|---|---|---|---|
| CN | 115264210 A | * | 11/2022 | ............ F16L 37/091 |
| EP | 0268251 A1 | * | 5/1988 | ............ F16L 37/091 |
| KR | 200150683 Y1 | * | 7/1999 | ............ F16L 37/091 |
| KR | 200400411 Y1 | * | 11/2005 | ............ F16L 37/091 |

* cited by examiner

*Primary Examiner* — Matthew Troutman
*Assistant Examiner* — Fannie C Kee

(57) ABSTRACT

A sealing cover with quick-plug interface, comprising: cover body, above which a through hole is arranged, and in which a communication hole is arranged, and said through hole is connected with said communication hole; an annular sealing member and an annular fixing sleeve are arranged in said through hole, and said sealing member is arranged at the bottom of said through hole, and said fixing sleeve is arranged above said sealing member; said sealing member and said fixing sleeve are both clipped to an inner wall of the through hole, and said sealing member is made of a flexible material. There is no metal material in contact with the fluid inside the sealing cover with quick-plug interface, so there is no hidden danger of corrosion in long-term use, and the defect that the metal material is not resistant to corrosive fluids is avoided.

6 Claims, 4 Drawing Sheets

SEALING COVER WITH A QUICK-PLUG INTERFACE

CROSS REFERENCE TO RELATED APPLICATION

This application claims priority benefit of Chinese design Application No. 202121600352.2, filed on Jul. 14, 2021, and the entire contents of which are incorporated herein by reference.

TECHNICAL FIELD OF THE INVENTION

The present invention relates to the technical field of fluid transportation, particularly a sealing cover with a quick-plug interface.

BACKGROUND OF THE INVENTION

The internal connection structure of the sealing cover with a quick-plug interface provided in the prior art is complex, and there are many sealing points, which increases the hidden danger of air leakage. And there are metal materials inside that will contact with the fluid. Because the pneumatic standard parts—quick plug connectors—are used to connect with the bottle cap and the shells of quick plug connectors on the market are made of metal material, the metal material will inevitably come into contact with the fluid. The residue from the passage of corrosive fluids will come into contact with the metal material and the metal material will slowly corrode after a period of time, which results in damage and leakage.

SUMMARY OF THE INVENTION

The present invention provides a sealing cover with a quick-plug interface, which solves the problem that the metal material inside the quick-plug interface is in contact with fluid for a long time, which causes the corrosion of the metal material.

In order to achieve the above object, the present invention provides the following technical solutions:

A sealing cover with quick-plug interface comprises a cover body 1, above which a through hole 2 is arranged, and in which communication hole 9 is arranged, and the through hole 2 is connected with the communication hole 9;

An annular sealing member 3 and an annular fixing sleeve 5 are arranged in the through hole 2, and the sealing member 3 is arranged at the bottom of the through hole 2, and the fixing sleeve 5 is arranged above the sealing member 3;

The sealing member 3 and the fixing sleeve 5 are both clipped to the inner wall of the through hole 2, and the sealing member 3 is made of a flexible material.

Preferably, the inner wall of the through hole 2 is provided with a first groove, and the outside (the outer surface) of the sealing member 3 is provided with a corresponding protrusion, and the sealing member 3 is clipped to the through hole 2 by means of the first groove and the protrusion.

Preferably, the inner wall of the through hole 2 is also provided with a second groove, and the outside (the outer surface) of the fixing sleeve 5 is provided with a barb structure, and the barb structure is clipped in the second groove.

Preferably, a fixing ring 4 is arranged above the sealing member 3, and the lower part of the fixing sleeve 5 is connected with the fixing ring 4;

The upper part of the inner wall of the sealing member 3 is provided with a circle of third groove, and a circle of "L" shaped connecting section protrudes from the lower part of the fixing ring 4, and the connecting section is clipped in the third groove in the inner wall of the sealing member 3;

The fixing ring 4 is made of plastic material.

Preferably, a movable cap 6 is also provided, the outside (the outer surface) of the movable cap 6 is provided with a barb structure, and the movable cap is inlaid with the inner wall of the fixing sleeve 5 by means of the barb structure.

Preferably, a circle of claw elastic pieces 7 is arranged in the fixing sleeve 5, and the bottom of the movable cap 6 collides with the claw elastic pieces 7.

Preferably, the tops of the movable cap 6 and the fixing sleeve 5 are all provided with a circle of "L" shaped connecting sections respectively.

Preferably, the inner wall of the cover body 1 is provided with a threaded structure, for screwing with bottle body;

The bottom of the threaded structure is provided with sealing ring 8.

By implementing the above technical solutions, the following technical effects are obtained: a sealing cover with quick-plug interface is provided, in which there is no metal material in contact with the fluid, and there is no hidden danger of corrosion after long-term use, avoiding the defect that the metal material is not resistant to corrosive fluid.

DETAILED DESCRIPTION OF THE PREFERRED EMBODIMENT

In order to better understand the technical scheme of the present invention, the embodiments provided by the present invention are described in detail below in conjunction with the accompanying drawings.

Figure 1:
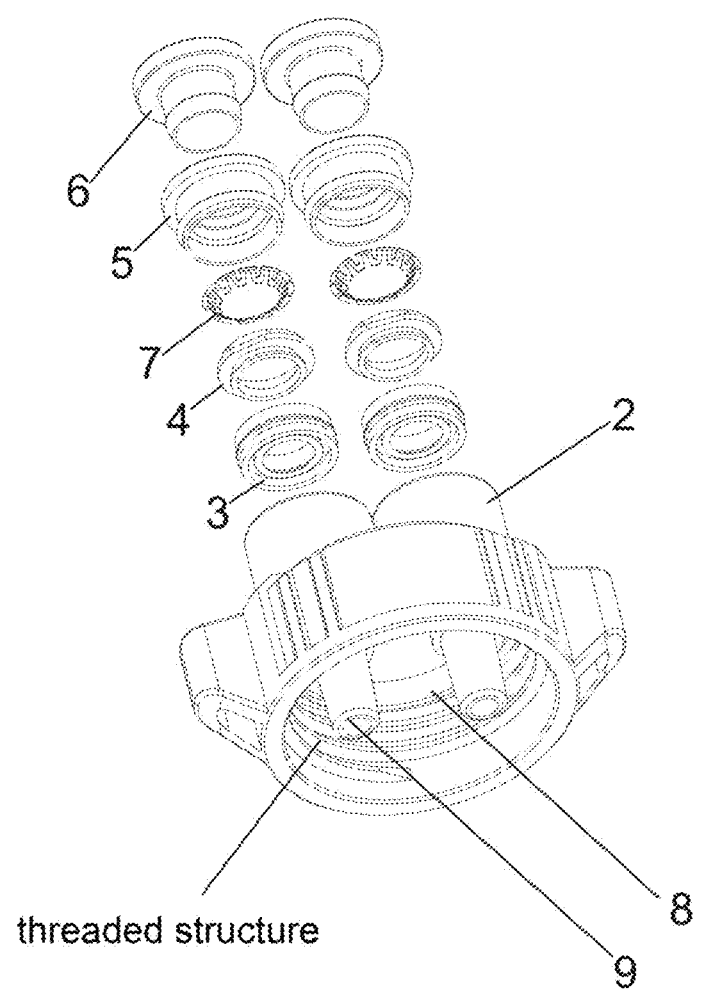
FIG. 1 is a schematic structural diagram (exploded view) of a sealing cover with a quick-plug interface provided by the present invention.
Figure 4:
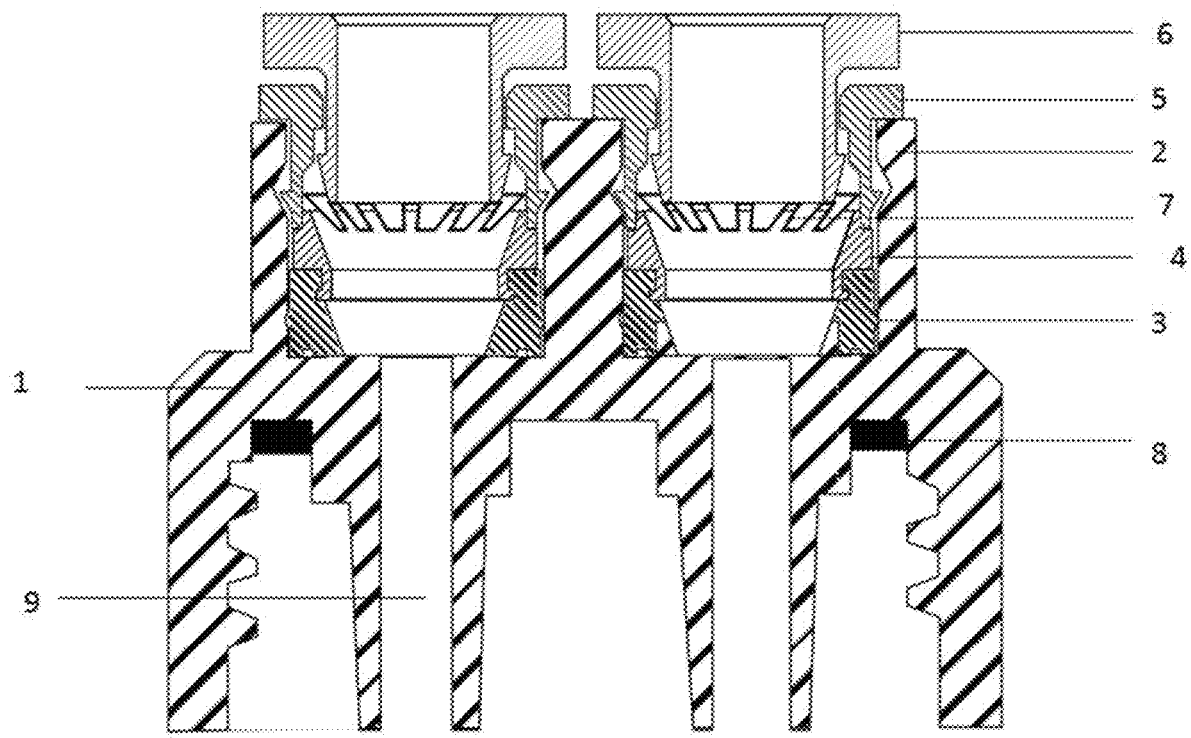
FIG. 4 is a cross-section diagram of the connection structure of a sealing cover with a quick-plug interface provided by the present invention.

As shown in FIGS. 1 and 4, it can be understood that the present embodiment provides a sealing cover with quick-plug interface, comprising: cover body 1, above which a through hole 2 is arranged, and in which communication hole 9 is arranged, and the through hole 2 is connected with the communication hole 9; an annular sealing member 3 and an annular fixing sleeve 5 are arranged in the through hole 2, and the sealing member 3 is arranged at the bottom of the through hole 2, and the fixing sleeve 5 is arranged above the sealing member 3; the sealing member 3 and the fixing sleeve 5 are both clipped to the inner wall of the through hole 2, i.e. the sealing member 3 and the fixing sleeve 5 are both stuck in the inner wall of the through hole 2. The inner wall of the through hole 2 is provided with a first groove, and the outside of the sealing member 3 is provided with a corresponding protrusion, and the sealing member 3 is clipped to the through hole 2 by means of the first groove and the protrusion. The inner wall of the through hole 2 is also provided with a second groove, and the outside of the fixing sleeve 5 is provided with a barb structure, and the barb structure is clipped in the second groove.

A fixing ring 4 is arranged above the sealing member 3, and the lower part of the fixing sleeve 5 is connected with the fixing ring 4; the upper part of the inner wall of the sealing member 3 is provided with a circle of third groove, and a circle of "L" shaped connecting section protrudes from the lower part of the fixing ring 4, and the connecting section is clipped in the third groove of the inner wall of the sealing member 3; the sealing member 3 is made of flexible material, and the fixing ring 4 is made of plastic material.

In the present embodiment, as shown in FIG. 4, the through hole 2 is used to insert the pipeline for fluid transportation, and is continuous connected with the communication hole. It is inevitable to contact fluids with a certain pressure or corrosiveness in use. In order to prevent the parts in contact with the fluid from being corroded, in this embodiment, the sealing member 3 is made of rubber-material, and the fixing ring 4 is made of plastic material. In other embodiments, the sealing member 3 and the fixing ring 4 can be made of other anti-corrosion materials. The "L" shaped connecting section in the lower part of the fixing ring 4 protrudes in the third groove of the inner wall of the sealing member 3, and is firmly nested with the sealing member 3 to support the sealing member 3 to maintain the shape thereof. In other embodiments, the nesting manner of the sealing member 3 and the fixing ring 4 is not limited.

The sealing cover with quick-plug interface provided by the present embodiment also comprises a movable cap 6, the outside of the movable cap 6 is provided with a barb structure, and the movable cap is inlaid with the inner wall of the fixing sleeve 5 by means of the barb structure. A circle of claw elastic pieces 7 is arranged in the fixing sleeve 5, and the bottom of the movable cap 6 collides with the claw elastic pieces 7. The tops of the movable cap 6 and the fixing sleeve 5 are both provided with a circle of "L" shaped connecting sections respectively.

In the present embodiment, the outside of the fixing sleeve 5 is a barb structure, which is pressed into the second groove of the inner wall of the through hole 2, and the movable cap 6 is installed and embedded in the fixing sleeve 5 by utilizing an external reverse buckle structure. In this embodiment, the fixing sleeve 5 and the through hole 2, and the movable cap 6 and the fixing sleeve 5 are all nested and fixed by means of using a reverse buckle structure respectively, and in other embodiments, they can also be fixed in other ways. The product components of the prior art rely on threaded connection during the assembly, connection and sealing process, which has high component cost, low efficiency and high cost. In this embodiment, the inner sealing member 3 is fixed by a reverse buckle structure, which minimizes the number of internal accessories, reduces the cost, reduces air leakage points and improves assembly efficiency.

As shown in FIG. 4, claw elastic pieces 7 are arranged in the fixing sleeve 5, which is used for clamping pipeline, concretely, pipeline is inserted and passes through the movable cap 6, claw elastic pieces 7 and fixing ring 4 until it is finally inserted into the sealing member 3 to the bottom. At this time, due to the elastic force of the claw elastic pieces 7, the pipeline is clipped and fixed; the fixing ring 4 plays a guiding role, and the sealing member 3 forms a coating effect on the pipeline to keep the seal. The sealing member 3 and the fixing ring 4 are made of rubber materials and plastic materials respectively, and can be in contact with corrosive fluid for a long time. When the pipeline needs to be pulled out, the movable cap 6 is pressed down so as to press down the claw elastic pieces 7, so that the surface of the pipeline and the claw are separated and loosened, and the pipeline can be pulled out smoothly.

Figure 2:
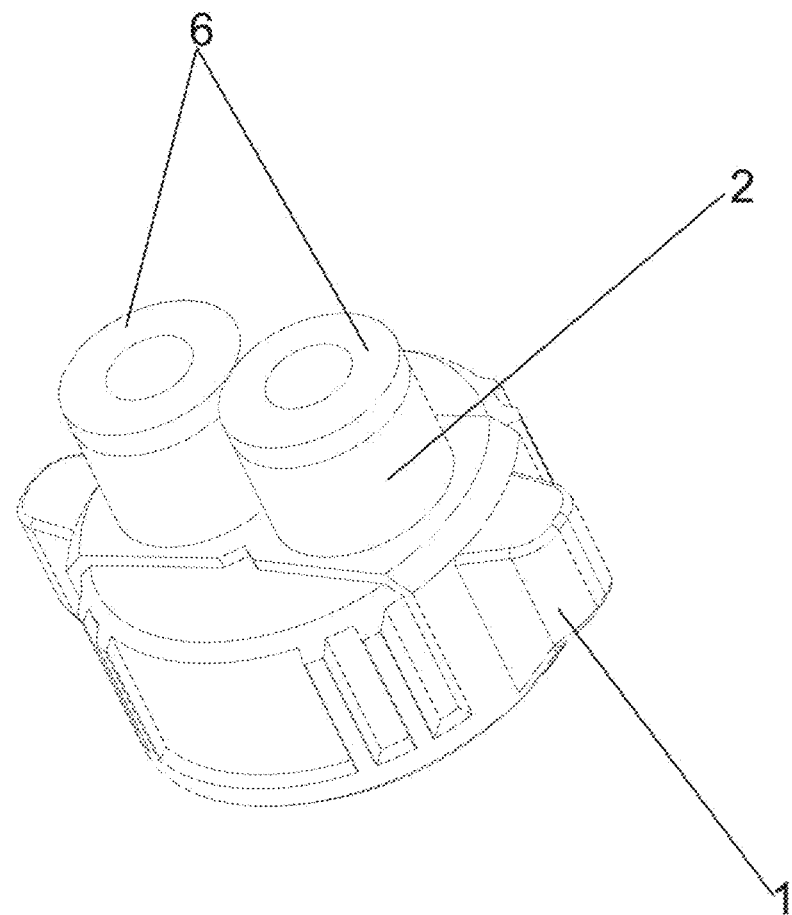
FIG. 2 is a schematic structural diagram (perspective view) of a sealing cover with a quick-plug interface provided by the present invention.
Figure 3:
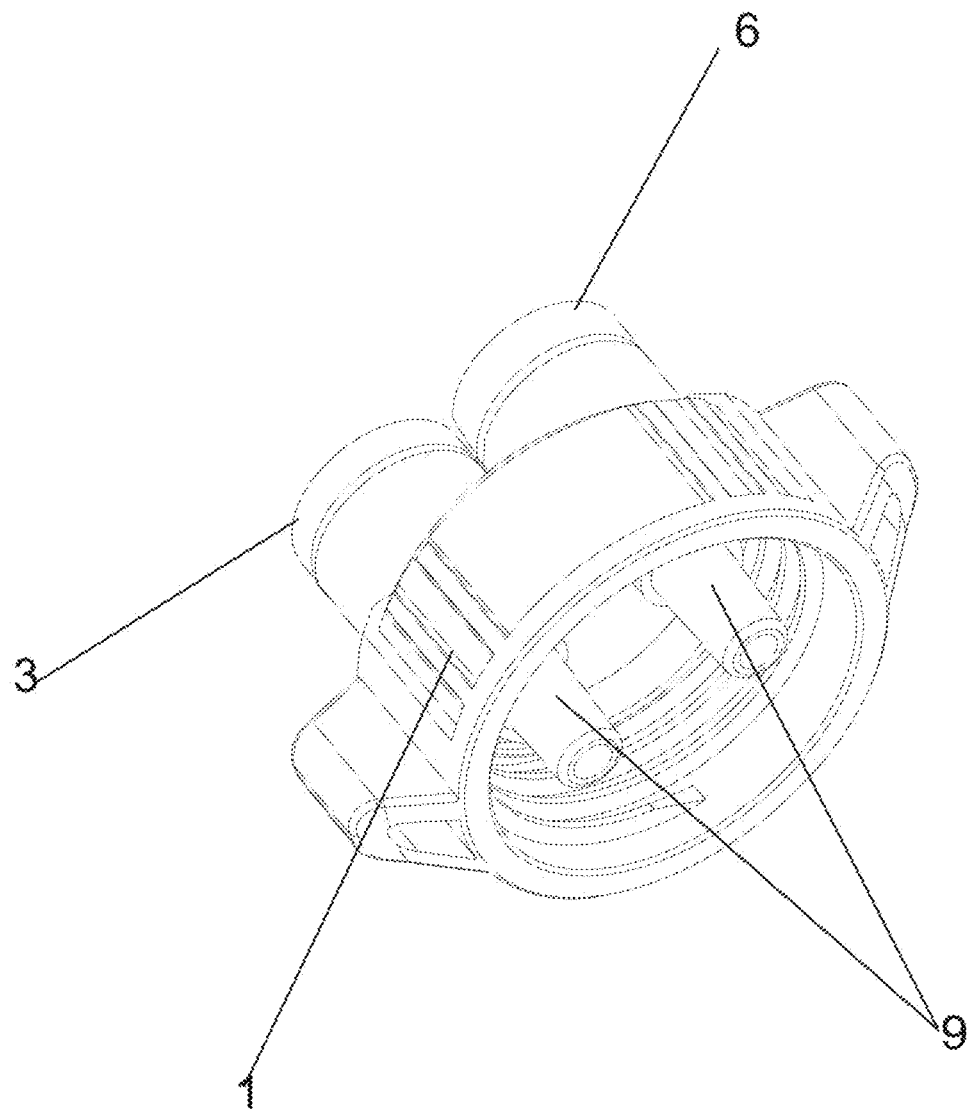
FIG. 3 is a schematic structural diagram (perspective view) of a sealing cover with a quick-plug interface provided by the present invention.

As shown in FIGS. 2 and 3, the cover body 1 in the present embodiment is made of plastic material and is integrally injection molded, and the inner wall of the cover body 1 is provided with a threaded structure for screwing with the bottle body; the bottom of the threaded structure is provided with a sealing ring 8 for connecting and sealing with the bottle opening. In this embodiment, the number of through holes 2 above the cover body 1 is two. In other embodiments, the number of through holes 2 can be one, three, etc. as required, which is not limited here.

The sealing cover with a quick-plug interface provided by the embodiment of the present invention has been described in detail above. For those skilled in the art, according to the idea of the embodiment of the present invention, there will be changes in the specific implementation and application scope. To sum up, the contents of this description should not be construed as limitations to the present invention.

The invention claimed is:

1. A sealing cover with quick-plug interface, comprising:
   a cover body, above which a through hole is arranged, and in which a communication hole is arranged, and said through hole is connected with said communication hole;
   an annular sealing member and an annular fixing sleeve are arranged in said through hole, and said sealing member is arranged at a bottom of said through hole, and said fixing sleeve is arranged above said sealing member; and
   said sealing member and said fixing sleeve are both clipped to an inner wall of the through hole, and said sealing member is made of a flexible material,
   wherein said inner wall of said through hole is provided with a first groove, an outside of said sealing member is provided with a corresponding protrusion, and said sealing member is clipped to said through hole by means of said first groove and said protrusion,
   wherein an inner wall of said cover body is provided with a threaded structure, for screwing with a bottle body; and
   a bottom of said threaded structure is provided with a sealing ring.

2. The sealing cover with quick-plug interface according to claim 1, wherein said inner wall of the through hole is provided with a second groove, an outside of said fixing sleeve is provided with a barb structure, and said barb structure is clipped in said second groove.

3. The sealing cover with quick-plug interface according to claim 1, wherein a fixing ring is arranged above said sealing member, and a lower part of said fixing sleeve is connected with said fixing ring;
   an upper part of an inner wall of the sealing member is provided with an annular third groove, and an annular "L" shaped connecting section protrudes from a lower part of said fixing ring, and said connecting section is clipped in said third groove in said inner wall of said sealing member; and
   said fixing ring is made of a plastic material.

4. The sealing cover with quick-plug interface according to claim 1, wherein a movable cap is provided, an outside of said movable cap is provided with a barb structure, and said movable cap is inlaid with an inner wall of said fixing sleeve by means of said barb structure.

5. The sealing cover with quick-plug interface according to claim 4, wherein an annular ring of claw elastic pieces is arranged in said fixing sleeve, and a bottom of said movable cap collides with said claw elastic pieces.

6. The sealing cover with quick-plug interface according to claim 4, wherein the tops of said movable cap and said fixing sleeve are provided with annular "L" shaped connecting sections respectively.

* * * * *